H. A. MYERS.
GEAR SHIFTING DEVICE.
APPLICATION FILED DEC. 29, 1913.
1,167,097.
Patented Jan. 4, 1916.
2 SHEETS—SHEET 1.
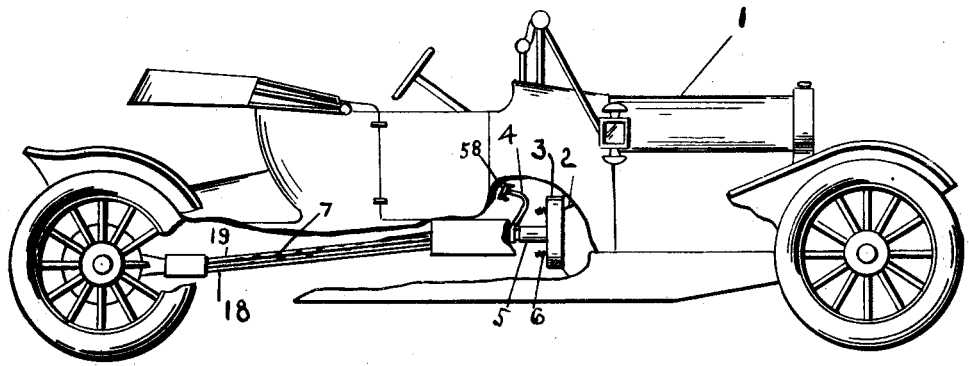
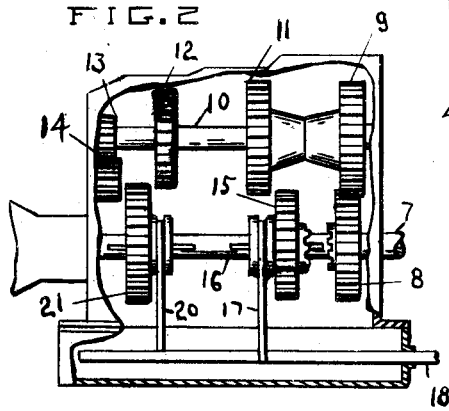
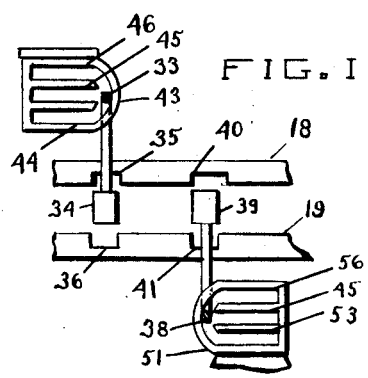
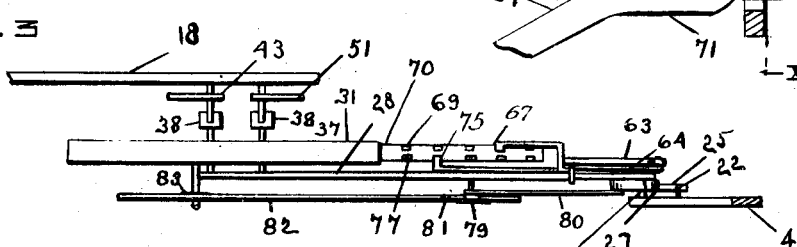
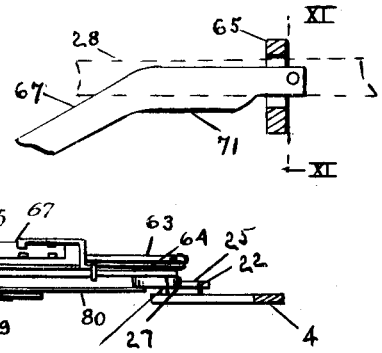
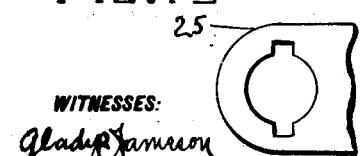
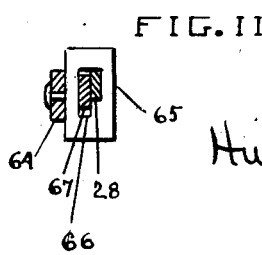
WITNESSES:
INVENTOR
Hubert A Myers
BY
ATTORNEY

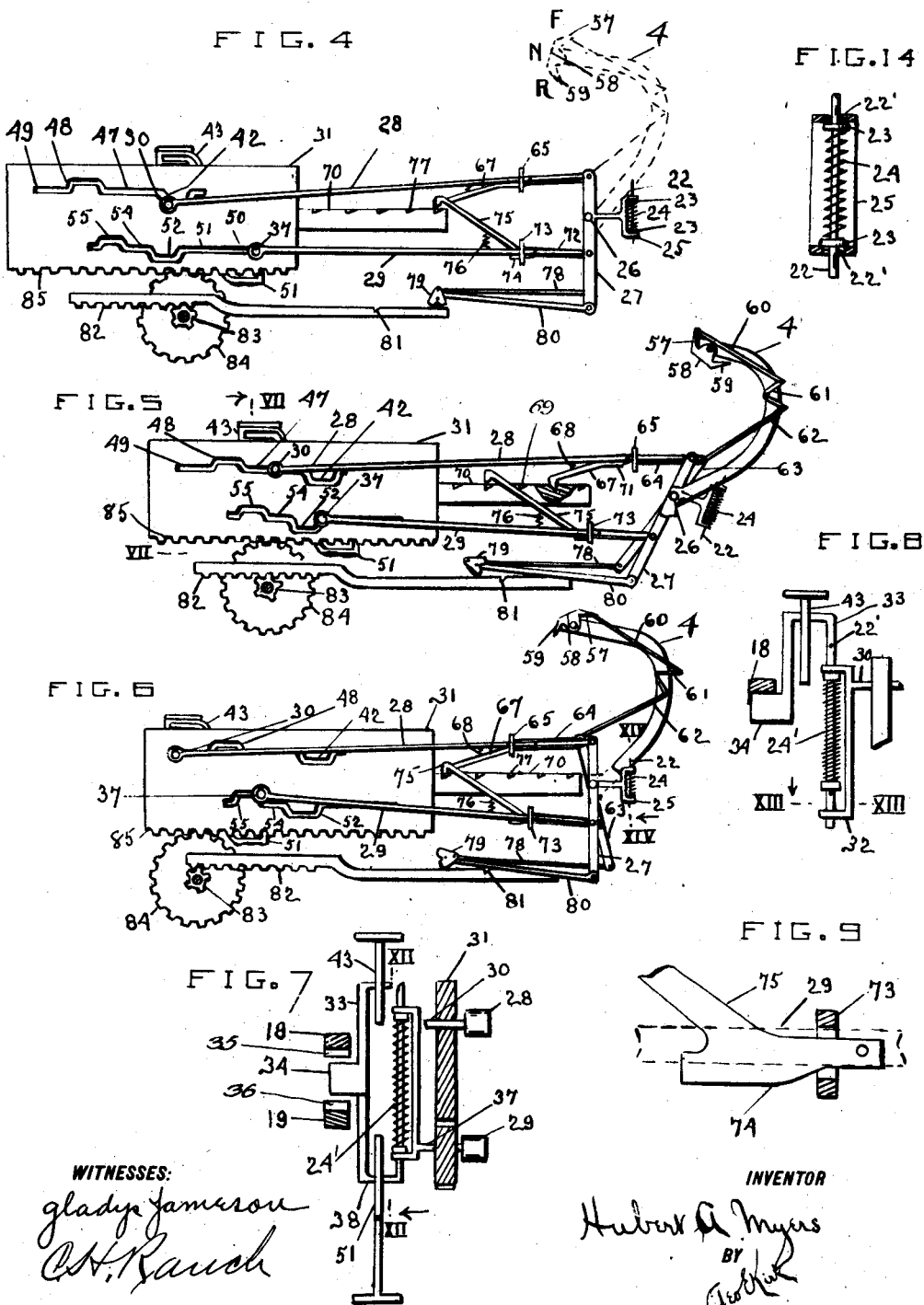

UNITED STATES PATENT OFFICE.

HUBERT A. MYERS, OF TOLEDO, OHIO, ASSIGNOR OF ONE-HALF TO ALBERT A. ATWOOD, OF TOLEDO, OHIO.

GEAR-SHIFTING DEVICE.

1,167,097.      Specification of Letters Patent.      Patented Jan. 4, 1916.

Application filed December 29, 1914. Serial No. 809,193.

*To all whom it may concern:*

Be it known that I, HUBERT A. MYERS, a citizen of the United States of America, residing at Toledo, Lucas county, Ohio, have invented a new and useful Gear-Shifting Device, of which the following is a specification.

This invention relates to a controller for effecting driving relation changes.

This invention has utility when embodied in a motor vehicle, more particularly as a single foot lever adapted to control a plurality of speeds of the vehicle.

Referring to the drawings: Figure 1 is a side elevation with parts broken away showing an embodiment of the invention in a motor vehicle; Fig. 2 is a plan view, with the housing broken away, of the variable speed driving mechanism; Fig. 3 is a plan view of features of the controller; Fig. 4 is a side elevation of the controller with parts in reverse position; Fig. 5 is a side elevation of the controller with the parts thrown to the set position for neutral control; Fig. 6 is a side elevation of the controller with the parts in high driving relation; Fig. 7 is a transverse vertical section on the line VII—VII Fig. 5, looking in the direction of the arrow; Fig. 8 is a detail of a yieldable setting element; Fig. 9 is a fragmentary detail of the control for the lower dog which actuates the controller cam plate to the left; Fig. 10 is a fragmentary detail of the control for the dog which actuates the cam plate to the right; Fig. 11 is a section on the line XI—XI Fig. 10, looking in the direction of the arrow; Fig. 12 is a view on the line XII—XII Fig. 7, looking in the direction of the arrow; Fig. 13 is a fragmentary view on the line XIII—XIII Fig. 8, looking in the direction of the arrow; and Fig. 14 is a section on the line XIV—XIV Fig. 6, looking in the direction of the arrow.

The motor vehicle 1 is provided with the motor or prime mover 2 actuating the driving member 3. The foot lever or pedal 4 is operable through the clutch sleeve 5 against the resistance of the clutch springs 6 to disconnect and connect the shaft 7 to the driving member 3. Fast to the shaft 7 (Fig. 2) is the gear wheel 8 in mesh with the gear wheel 9 fast on the counter shaft 10, which counter shaft 10 carries gears 11, 12, 13, the latter in mesh with the intermediate pinion 14. The gear wheel 15 adjacent the gear wheel 8 is splined on the shaft 16 in alinement with the shaft 7 to be actuated by the fork 17 on the reciprocable shift member 18 into direct driving engagement with the gear 8 or by longer opposite shift into the intermediate lower speed driving relation with the gear 11. Parallel with the shift member 18 is the shift member or bar 19 carrying the fork 20 to shift the gear wheel 21 splined on the shaft 16 into driving relation with the gear wheel 12 for slow speed forward driving or into mesh with the pinion 14 for reverse direction driving. The shifts of this speed changing means or variable speed transmission mechanism for driving at reverse, slow and intermediate are the same, while the shift into direct or high is a shorter travel.

The foot lever 4 has one end of the rod 22 loosely engaged therewith. In this rod 22 are pins 22′ adjacent the collars 23 at each end of the spring 24 surrounding the rod 22. The collars 23 on the rod 22 are embraced by the fork 25 mounted on the pivot 26 to yieldably rock the cross arms 27 and normally hold said arms 27 in neutral relation as to the foot lever 4. The ears of the fork or yoke 25 have recesses extending from the central circular guide opening for the rod 22, permitting passage therethrough of the pins 22′ (Fig. 13). The upper of the cross arms 27 has the link 28 connected thereto, while the lower arm has a similar link 29.

Engaging the link 28 is the pin 30 extending through the guiding controller plate 31. This pin 30 is connected to the yoke 32 engaging the neutral spring 24′ for controlling the rod 33 carrying the tooth 34 movable to engage the notch 35 in the shift member 18 or the notch 36 in the shift member 19 (Figs. 7, 8, 12).

The link 29 coacts with a pin 37 similar to the pin 30, and engages a second yoke 38, having another spring 24′ therein for controlling the yoke or rod 38 which has the tooth 39 movable to engage in the recess 40 in the shift member 18 and also in the recess 41 in the shift member 19. The double neutral springs 24′ serve yieldably to maintain the elements 34, 39, set in central disconnecting position as to the shift members 18, 19. The control of these elements or teeth 34, 39, is by ways in the guide plate 31. For instance in Fig. 4 the pin 30 is forced down by the way portion 42, which will cause the element or tooth 34 to move into the notch 36, when the lever 4 is at its forward position of thrust. On the recover or rearward travel, the link 28 causes the element or tooth 34 to carry the shift member 19 rearwardly and thus through the fork 20 move the gear 21 into mesh with the pinion 14 for reverse travel. The element or tooth 34 has its arm portion 33 passing through the guide 43 which has the ways 44, 45, 46, connected at one end, which end is the position for the arm portion 33 when the foot lever 4 is at down or clutch disconnecting position. Accordingly at this point the neutral spring 24' may act and, as forced by the guideway 42, cause the arm portion 33 to move in the way 44, thereby holding the element 34 in engagement with the recess 36 in the shift bar 19 at all times when the shift bar 19 holds the gear 21 in driving relation with the pinion 14. The adjacent way portion 47 connected to the way portion 42 would tend to hold the element 33 in the neutral way 45 of the retaining guide 43, thereby holding the tooth or element 34 of the arm portion 33 out of engagement with each of the shift members 18, 19. The way portion 48 connected to the way portion 47 would tend to lift the arm portion 33 for travel in the way 46 and thus have the tooth 34 engage with the recess 35 in the shift bar 18 for throwing the gear 15 into driving relation with the gear 11 for intermediate or second speed forward. The way portion 49 connected to the way portion 48 would again hold the arm portion 33 in neutral or disconnected position as to the shift bars 18, 19.

The pin 37 of the link 29 passes through the guide control plate 31 in Fig. 4 at the way portion 50 which holds the tooth element 39 in disconnected position as to the members 18, 19 for travel in the neutral retaining guideway 45 of the retaining guide 51. The way portion 52 connected to the way portion 50 in the plate 31 tends to act through the neutral spring 24' of the yoke or rod element 38 to draw the tooth 39 downward for engagement with the shift bar 19 and thereby effect movement of the gear wheel 21 into mesh with the gear wheel 12 for driving at slow speed forward. This yoke or rod element is held in engagement during this driving relation by the way 53 in the retaining guide member 51. Connected to the way portion 52 is the way portion 54 in the controlling plate 31 for holding the yoke or rod element 38 in disconnecting position, while connected to this way portion 54 is the way portion 55 tending to yieldably force the element 38 upward or cause the tooth member 39 to engage in the shift member 18 at the recess 40. This recess is a little wider than the tooth 39 so that in the travel of the shift member 18, the movement is somewhat less than when a recess other than the recess 40 is engaged for shifting. This travel of the shift member 18 will draw the gear 15 for direct clutch engagement with the gear 8. During this driving relation engagement the parts are held so assembled by the yoke or rod element 38 riding in the way 56 of the retaining guide 51.

The relation of the ways for the pins 30, 37 is such that but one at a time is in driving relation or may be shifted into driving relation to determine a driving relation connection. To change the control or driving relation selection, shifting of the guide 31 will cause the elements or pins 30, 37 to be moved. This guide 31 is shifted positively.

Mounted on the free extremity of the foot lever 4 are the tread portions 57, 58, 59, grouped together and simultaneously rockable by shifting of the foot of the operator thereon. This tread member has the link 60 extending therefrom to the bell crank 61 on the lever 4, to which bell crank 61 is connected the link 62 to actuate the cross arm 63 on the pivot bearing 26 for the cross arm 27. This cross arm 63 has near its upper end the link 64 extending to the collar 65. This collar 65, slidable on the link 28, has recess 66 (Fig. 11) therein for engagement with the dog 67 pivotally mounted on the link 28 (Fig. 10) and normally forced by spring 68 into engagement with teeth 69 in the extension 70 of the guide plate 31. This dog 67 in its coaction with the teeth 69 serves to draw the guide 31 toward the pivot shaft 26 of the foot lever 4 or forward as shown in Fig. 5. Accordingly with the tread 57 rocked into position for moving the actuator or foot lever 4 the collar 65 is shifted clear of the cam 71 on the dog 67 so that the spring may cause this dog to engage in the teeth 69 of the extension 70 of the guide 31. Therefore, with this tread face or portion 57 used there is a progressive or step by step travel of the guide 31 forward, which means that, say, from the reverse position or limit rearward of the plate 31 as shown in Fig. 4, there may be a gradual increase in speed forward to neutral, slow, intermediate and high. With the tread face 58 of the foot lever 4 in actuating position (Fig. 4), the collar 65, embracing and slidably supported on the link 28, coacts with the cam 71 to hold the dog 67 out of operative relation. Simultaneously the link 72, extending from the cross arm 63, holds the loose collar 73 on the link 29 in such position as to the cam 74 formed on the dog 75 (Fig. 9) that this dog 75 pivotally mounted on the link 29 is held against the action of spring 76 out of engagement with the teeth 77 in the extension 70 of the plate or guide 31. The link 64 is secured to the collar 65, and the link 72 is secured to the collar 73. Accordingly these dogs 75 and 67 are out of operative engagement. The cross arm 63 also carries link 78 extending to the rocking shield 79 pivoted on the dog 80 mounted on the lower extremity of the cross arm 27. In the rocking of the cross arm 63 to pull the dogs 67, 75 out of engagement, the link 78 shifts the shield 79 to permit this dog 80 to engage in the notch 81 of the rack bar 82 and through pinion 83 and gear wheel 84 in mesh with the rack 85 of the guide member 31, draw this guide to cause the pins 30, 37 to ride in the neutral guide portions 47, 50, of the portions in the member 31, thereby holding the teeth or elements 34, 39, in neutral or disengaging position as to the shift means 18, 19. Accordingly in normal driving if the tread portion 58 is in active position any thrust of the foot lever 4 forward is going to bring the driving relation to neutral or disengaging position at once through the above described operation of the dog 80 and parts actuated thereby. Any position of the cross arm 63 allowing dog 67 or 75 to engage the toothed portion 69 or 77 of the extension 70 holds the shield 79 to keep the dog 80 out of engagement with the notch 81.

In driving forward, should it be desired to progress downwardly, or that is, reduce speed, step by step even to reverse, the tread member of the speed determining means may be rocked to have the face 59 in active position (Fig. 6), thus permitting the dog 75 to engage in the recesses 77 of the extension 70 of the guide 31 in order that on each forward travel of the foot lever 4, the dog 75 may actuate the guide 31 one step rearwardly or away from the lever fulcrum 26 until reverse is reached. Each thrust of the lever 4 of the actuator forward, besides shifting the guide 31, moves each link 28, 29. These act through the elements 33, 38, to throw their respective tooth portions 34, 39 into engagement one at a time, as urged by the springs 24', with the bars 18, 19, of the speed changing means.

With the device of the disclosure herein the actuator or foot lever 4 may be thrust forward to disconnect the clutch from driving relation, with the mechanism for establishing a plurality of driving relations between the driving member and the driven member. In this disconnecting travel of the actuator 4, the elements of the speed determining means come into play and the next determined speed relation of neutral or next higher or next lower speed is set yieldably through the double neutral spring 24 in the yoke 25, and as the elements 33, 38 are out of central or neutral way determining disconnecting positions in the retaining guides 43, 51, either tooth element 34, or 39, may be yieldably shifted by its neutral spring 24' into meshing engagement with the determined shift member 18, 19, so that on the recover travel of the foot lever 4 the other driving relation is directly determined by these elements of the speed determining means shifting the bars 18, 19, for speed changing means actuation in such timed relation as to slightly anticipate the clutch drive. Accordingly the parts at once assume the determined driving relation.

With the elements in the position shown in Fig. 4, a thrusting of the pedal forward, with the neutral tread face 58 in working position, no shifting of the guide 31 will occur and no connecting up for a driving relation will be made, for the link 60, angle lever 61, link 62, cross arm 63, and link 64 to collar 65, operate to move this collar 65 along the link 28 to hold the dog 67 against the action of the spring 68 out of engagement with the toothed portion 69 of the extension 70 of the plate 31. The link 72, from the cross arm 63 also holds the collar 73 in position on the link 29 to hold the dog 75 against the action of the spring 76 out of engagement with the toothed portion 77 of the extension 70 of the plate 31. The link 78 from the cross arm 63 holds the shield 79 so that the dog 80 may engage the notch 81 in the rack bar 82, but as this bar 82 is in the position for holding the plate 31 in the position to keep the teeth 34, 39, out of engagement with the recesses in the bars 18, 19, the rocking of the pedal lever 4, will cause the rod 22 to act through the spring 24, fork 25, pivot 26 and cross arm 27 to move the dog 80 into position to engage the notch 81 at the limit of travel of the dog 80, and then on the recover travel of the pedal lever 4 be withdrawn therefrom. So, of the several connections, no shifting or travel of the guide 31 occurs.

Rocking of the tread portion so that the face 57 is in active position, as shown in Fig. 5, rocks the link 60, angle lever 61, link 62, and cross arm 63 relative to the cross arm 27, so that the link 64 moves the collar 65 to release the dog 67 to be forced by the spring 68 into engagement with the toothed portion 69 of the extension 70. The link 72 holds the collar 73, in this position of the cross arm 63 relative to the cross arm 27, keeping the dog 75 out of engaging relation with the extension 70, while the link 78 rocks the shield 79 so that the dog 80 may not engage in the notch 81 of the rack bar 82. In the forward thrust of the lever 4 to release the clutch, the dog 67 engages the extension 70 to pull the guide 31 forward one tooth 69. This would bring the pin 30 to ride in the way portion 47, for holding the tooth 34 disconnected from the bars 18, 19, while the pin 37 would ride in the way portion 52 of the guide 31, thus through spring 24' and element 38 actuating the tooth 39 into the notch 41 (Fig. 12). In the recover travel of the lever 4, the link 29 from the cross arm 27, pulls the bar 19 forward to shift the gear 21 into mesh with the gear 12, and the result is first or slow speed forward driving connection of the gearing. In this travel of the link 29, its pin 37 is in the way portion in the guide 31, while the element 38 now is held in the way 53 to maintain the driving connection selection. Before element 38 was acted upon to effect the shifting of the tooth 39 into engaging position with the notch 41, this element 38 was held in the way 45 of the fixed guide 51. If the speed is to be further increased, it may be done only one step at a time. With the face 57 still active, further actuation of pedal 4 will effect shifting of the guide 31 to cause the way portion 48 to act upon the pin 30 of the link 28, and through the spring 24' and element 33 cause the tooth 34 to enter the recess 35 in the bar 18, and in the recover travel of the pedal 4, bar 18 will be shifted rearwardly to carry the gear 15 into mesh with the gear 11. However, in the forward travel of the pedal 4, the bar 19 was first drawn to disconnect the gear 21 from the gear 12, the guide way portion 54 directing the pin 37 to cause the spring 24' to hold the element 38 in position for the guide way 45 and place the tooth 39 out of engagement with the bar 19. The element 33 was simultaneously directed by the way 45 in the fixed guide member 43 to travel in position to be directed into the way 46 for the recover travel. The shield 79 is still acting to keep the dog 80 inactive, while the meshing of the gear 84 with the rack 85 on the guide 31 has shifted the bar 82. To get to high speed forward, it is necessary to make another thrust and recover of the pedal 4 with the face 57 still active. The thrust will bring the pin 30 into the way portion 49, so that the bar 18 with the gear 15 may be shifted to disconnect the intermediate or second speed forward driving connection. The spring 24' acts to move the element 33 for recover travel in the way 45 of the fixed guide 43. The pin 37 in the way portion 55 causes the element 38 through the spring 24', to move from the way 45 in the fixed guide 51, to the way 56, thus urging the tooth 39 to enter the recess 40 in the bar 18, and in the recover travel of the pedal 14, pull the bar 18 forward and thus shift the gear 15 for direct clutch connection with the driving shaft 7.

From any position of driving connection, bringing the face 58 into active position and thrusting the pedal 4 forward will hold the dogs 67, 75, out of engagement with the extension 70, but leave the dog 80 free to enter notch 81 and in the recover bring the guide 31 so that the ways 47, 50, are effective to direct the pins 30, 37, for disconnected position, after bringing the connected bar 18 or 19 to disconnecting position.

Movement to bring the pedal face 59 into active position will act through the link 60, angle lever 61, link 62, to rock the cross arm 63 (Fig. 6) so that the link 64 causes the collar 65 to hold the dog 67 away from the toothed portion 69 of the extension 70, while the link 72, shifts the collar 73 so that the dog 75 may engage the toothed portion 77 of the extension 70, and the shield 79 is so rocked by the link 78 that the dog 80 may not be effective. In the forward travel of the pedal, the guide 31 is moved rearwardly of the vehicle one tooth distance, thus changing the driving connection from high to intermediate, or if starting from neutral or disconnected position, effecting connection for reverse.

For reverse, the pin 30 is in the way portion 42 and the pin 37 is in the way portion 50. Tooth 39 is accordingly disconnected from bars 18 and 19, and pin 30 through the spring 24' causes the element 33 to shift the tooth 34 into the recess 36 in the bar 19 as the element 33 is directed from the way 45 to the way 44 in the fixed guide 43. In the recover of the pedal 4, the link 28 causes the bar 19 to travel rearwardly and shift the gear 21 into driving relation with the gear 14, thus effecting the backing or reverse driving for the vehicle.

This controller for driving relation is most simple and efficient and in itself is an insurance against rough usage of the machine, for extremes in successive driving relation connections of the gearing are impossible. The progress may be gradually up to speed or down to nothing, or to reverse, or directly into neutral from any driving relation forward or reverse. However, it takes two acts to reverse the travel of the machine. That is the machine must be brought to neutral before there can be a change in direction of travel, a safeguard of material value in protecting the driving mechanism.

What is claimed and it is desired to secure by Letters Patent is:

1. In a motor vehicle, variable speed driving mechanism, speed changing means, speed determining means, and an actuator including a pedal coacting with each of said means.

2. In a motor vehicle, variable speed driving mechanism, speed changing means, speed determining means, a driving member, a clutch for connecting the driving member to the mechanism, and an actuator for controlling said clutch, said actuator including a pedal coacting with each of said means.

3. A driving member, a driven member, mechanism for establishing a plurality of driving relations therebetween, speed changing means embodying a shift member connectible to the mechanism and movable to change the speed of the driven member, an actuator having connections for moving the shift member, and means controllable from the actuator for determining the movement of the shift member.

4. A driving member, a driven member, mechanism for establishing a plurality of driving relations therebetween, speed changing means embodying a shift member for effecting change in the driving relations of the mechanism, an actuator embodying a lever having connections for moving the shift member, and means controllable from the lever and movable independently thereof for determining the direction of movement of the shift mmber.

5. A driving member, a driven member, mechanism for establishing a plurality of driving relations therebetween, speed changing means embodying shift members for effecting change in the driving relations of the mechanism, an actuator to engage the shift members, said actuator including a pedal, and means controllable from the pedal for determining the shift member to be engaged by the actuator.

6. A driving member, a driven member, mechanism for establishing a plurality of driving relations therebetween, speed changing means embodying shift means for effecting change in the driving relations of the mechanism, an actuator connectible for moving the shift means, and means controllable from the actuator and relatively movable thereto for determining the next higher or next lower speed driving relation to be connected by the actuator in engaging the shift means.

7. A driving member, a driven member, mechanism for establishing a plurality of driving relations therebetween, speed changing means, a clutch for connecting the driving member to the mechanism, an actuator for the clutch, and speed determining means controlled from the actuator for connecting the speed changing means for progressive speed changes.

8. A driving member, a driven member, mechanism for establishing a plurality of driving relations therebetween, speed changing means, a clutch for connecting the driving member to the mechanism, an actuator for the clutch, speed determining means controllable from the actuator for connecting the speed changing means for progressive speed changes, and means for moving the speed changing means at any time to disconnecting driving relation.

9. In a motor vehicle, variable speed driving mechanism, speed changing means, speed determining means, and an actuator for progressively operating the speed changing means, said actuator including a pedal common to both of said means.

10. In a motor vehicle, variable speed driving mechanism, speed changing means, speed determining means, an actuator for the speed changing means including a pedal common to each of the means, and means for moving the speed changing means at any time to disconnecting driving relation.

11. A driving member, a driven member, mechanism for establishing a plurality of driving relations therebetween, speed changing means, a clutch for connecting the driving member to the mechanism, an actuator for the clutch including a foot lever, and speed determining means controllable from the foot lever for connecting the speed changing means for progressive speed changes.

12. A driving member, a driven member, mechanism for establishing a plurality of driving relations therebetween, speed changing means, a clutch movable for connecting the driving member to and disconnecting the driving member from the mechanism, a reciprocable actuator for the clutch, and speed determining means operable from the actuator during the clutch disconnecting travel of the actuator to connect the speed changing means for progressive speed changes.

13. A driving member, a driven member, mechanism for establishing a plurality of driving relations therebetween, speed changing means, a clutch movable for connecting the driving member to and disconnecting the driving member from the mechanism, a reciprocable actuator for the clutch, and a controller operable from the actuator during the clutch disconnecting travel of the actuator, said actuator having means to determine connection of the speed changing means to next higher or next lower speed.

14. In a motor vehicle, variable speed driving mechanism, speed changing means, speed determining means, and an actuator embodying a rockable tread connected to the speed determining means to determine by its rocked position the connection of the speed changing means for next higher or next lower speed.

15. A driving member, a driven member, mechanism for establishing a plurality of driving relations therebetween, speed changing means, a clutch for connecting the driving member to the mechanism, an actuator for the clutch, and speed-determining means for the different driving relations of the speed changing means, said speed changing means being always set for the next driving relation during the travel of the actuator effecting clutch release.

16. A driving member, a driven member, mechanism for establishing a plurality of driving relations therebetween, speed changing means, and an actuator for progressively operating the means, said actuator including a control member common to both of said means.

17. A driving member, a driven member, mechanism for establishing a plurality of driving relations therebetween, a clutch for connecting and disconnecting the driving member to and from the mechanism, an actuator for the clutch, and a controller for the driving relations embodying shift means, a guide provided with connections for operating the shift means during disconnecting travel of the actuator, and an element directed by the guide for engaging the shift means.

18. A driving member, a driven member, mechanism for establishing a plurality of driving relations therebetween, a clutch for disconnecting the driving member from the mechanism, an actuator for the clutch, and a controller for the driving relations embodying shift means, a guide provided with connections for operating the shift means during disconnecting travel of the actuator, and a yieldable element directed by the guide for moving the shift means.

19. A driving member, a driven member, mechanism for establishing a plurality of driving relations therebetween, a clutch for disconnecting and connecting the driving member from and to the mechanism, an actuator for the clutch, and a controller for the driving relations embodying shift means, a guide provided with connections for operating the shift means during disconnecting travel of the actuator, an element directed by the guide for moving the shift means during a travel of the clutch actuator, and a second guide retaining the element in engagement with the shift means during connected driving relation of the mechanism.

20. A driving member, a driven member, mechanism for establishing a plurality of driving relations therebetween, speed changing means, an actuator device connectible to the speed changing means, and speed determining means for acting upon the actuator device including a first element movable to direct the actuator device and movable with the actuator device, a second element movable independently of the position of the actuator device, and yielding means between said elements.

21. A mechanism control device embodying an actuator device, and means for positioning the actuator device including a first element movable with the actuator device to direct the actuator device, a second element movable independently of the position of the actuator device, a spring between said elements, and a guide for the first element precluding directing movement of the actuator device thereby at certain positions of the actuator device.

22. A mechanism control device embodying a member to be directed, a first element movable in its directing action with the member, a second element movable independently of the position of the member, a spring between the elements, and element guiding means precluding directing movement of the member thereby at certain positions of the member.

In witness whereof I affix my signature in the presence of two witnesses.

HUBERT A. MYERS.

Witnesses:
 GLADYS JAMESON,
 GEO. E. KIRK.